Patented Nov. 3, 1942

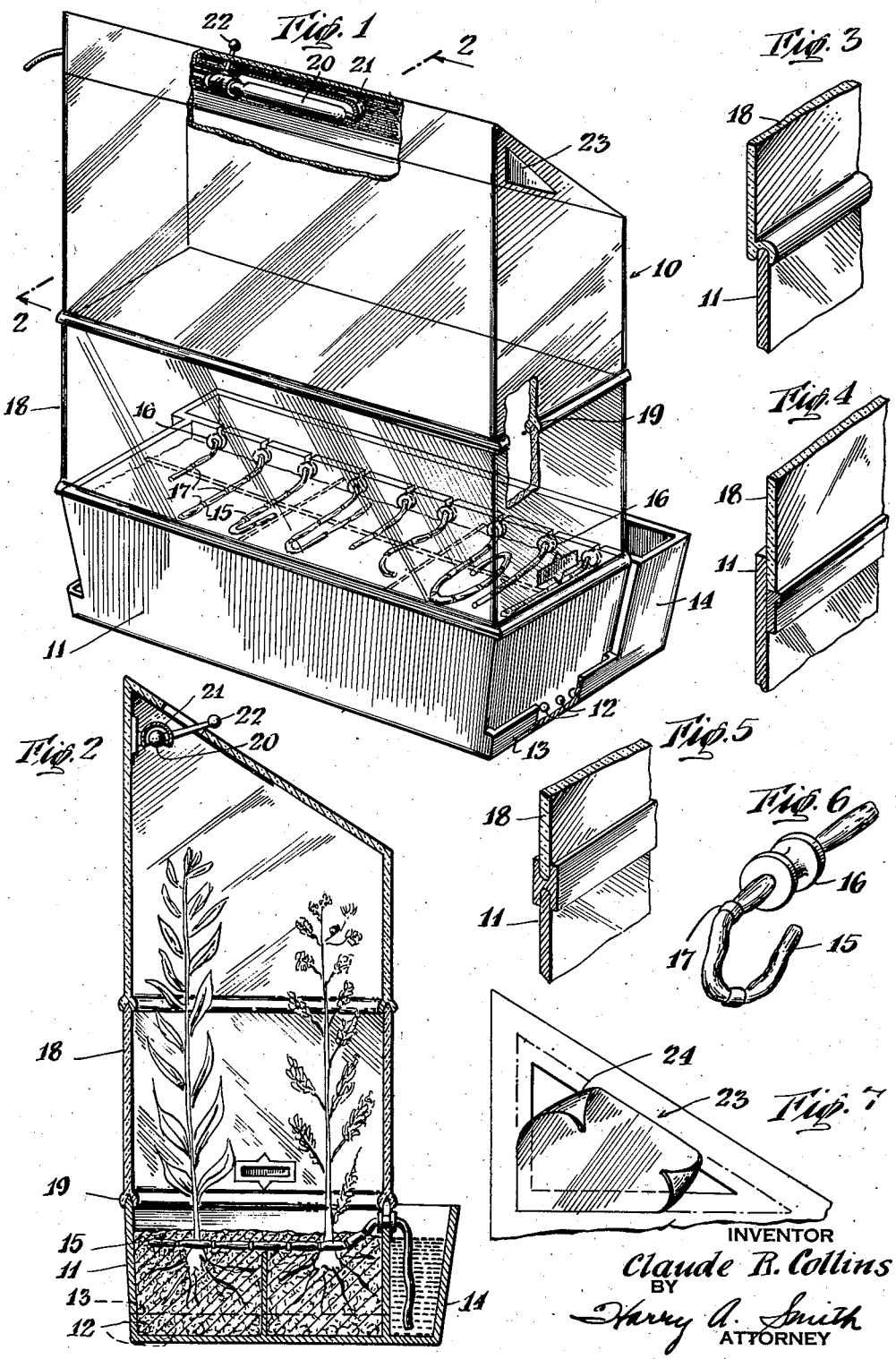

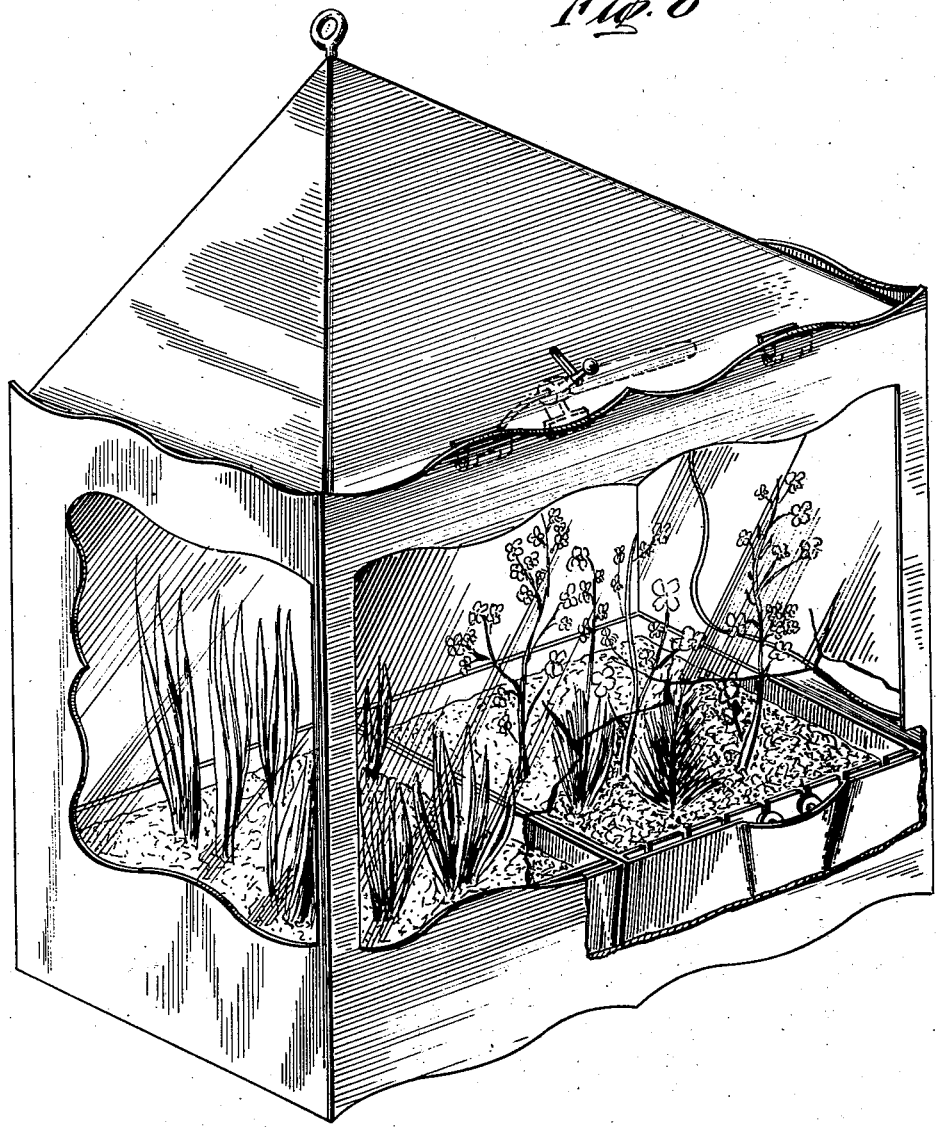

2,300,776

UNITED STATES PATENT OFFICE 2,300,776

PLANT PROPAGATOR

Claude R. Collins, Pennington, N. J.

Application March 14, 1941, Serial No. 383,272

4 Claims. (Cl. 47—38)

This invention relates to plant propagators and, more particularly, to indoor propagators, for the growth and cultivation of plants of various kinds under conditions most nearly simulating their natural environments and requirements.

Previous methods and means of growing plants indoors in various types of open containers and hothouses were accompanied by many disadvantages, for example, failure properly to provide the necessary degree of humidity, unsatisfactory means of irrigation and aeration, and the necessity of keeping plants near windows to provide light for growth. Under such circumstances, some hardy plants survived, but many were short lived and it was, therefore, impossible properly to grow many beautiful and delicate plants in the household.

These and other difficulties are overcome by the present invention which provides an indoor propagator wherein substantially all of the prime essentials successfully to grow plants are present under substantially ideal conditions. The invention particularly contemplates the utilization of artistic forms of containers therefor, which in themselves will enhance the decorative qualities and effects of the room in which they are located.

General objects of the invention are to provide a propagator which is sturdy in construction, economic of manufacture and usable in conjunction with artful and decorative indoor household designs adaptable to accommodate growth, cultivation and propagation of plants under such conditions.

Specific objects of the invention are the provision of a propagator in which humidity and temperature may be kept substantially constant; an overhead controlled electric lighting and heating unit located therein in the relative position of the sum; water reservoir as an integral part thereof which is readily fillable and holds sufficient water to supply the plants in the container for a prolonged period; means adapted automatically to carry water in controlled amount from the reservoir to an area beneath the soil surface for downward dispersion of the plant roots; a transparent superstructure of glass, plastic material or the like adapted to accommodate intermediate sections if necessary as plant growth progresses; venting means automatically responsive to rise and fall in temperature and consequent resulting humidity conditions; and, means adapted to control aeration and soil drainage.

Other objects of the invention will in part be obvious and will in part appear hereinafter.

The invention accordingly comprises the features of construction, combination of elements, and arrangements of parts, which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Fig. 1 is a perspective view, partly broken away and partly in section, illustrating schematically one preferred form of basic construction of the invention adapted for use in combination with artful and decorative household designs;

Fig. 2 is a vertical sectional view, with parts broken away, taken along the line 2—2 of Fig. 1, looking in the direction of the arrows;

Figs. 3, 4 and 5 are fragmentary perspective views illustrating three additional ways in which various sections of the device may be snugly fitted together depending on the particular type of material or construction employed;

Fig. 6 is a perspective view illustrating a preferred form of grommet seal used in connecting the water supply and soil container and through which a water-carrying wick passes;

Fig. 7 is a plan view, partly broken away, of the upper angular portion of the propagator showing a vent and its associated humidity and heat responsive vent flap partly opened; and Fig. 8 is a perspective view illustrating one application of the invention in which a slightly modified construction of Figure 1 is used in conjunction with a hanging shelf.

Referring more particularly to Fig. 1 of the drawings, a propagator indicated generally at 10 is shown constructed in sections and these sections may be combined and built as best facilitates the adaptation of the invention to uses in various forms. A bottom section, or soil container 11, preferably made of metal, ceramics or any other suitable material, is the receptacle for the plant or plants and contains the medium in which the roots thereof are located. In the bottom or preferably on the sides of this base, apertures 12 are pierced to furnish drainage and aeration of the soil, two very important and primary essentials in plant propagation, since lack of adequate drainage and aeration will cause the soil to become moldy, sour and, in turn, rot the roots of the plants. Preferably at the bottom edge and integral with the base, where are located the apertures 12, there is provided a drainage receptacle 13 of suitable form.

Attached to one or more sides, possibly encircling or under the soil container, depending upon the construction of the propagator, is a reservoir 14 in which water is stored for constant supply to the plants. This is done through the medium of one or more wicks 15 running from the reservoir through grommetted openings 16, where the water is dispersed downwardly directly beneath the upper soil surface area. An important feature of these wicks is that they do not feed the plant roots from the bottom, a practice which is not conducive to healthy plant growth, but are placed immediately beneath the surface of the soil so that the water is dispersed downwardly by capillarity and other natural forces through the soil before the water reaches the roots. In this way only such moisture as is needed by the roots is supplied thereto while simultaneously keeping the surrounding soil surface moist. Furthermore, another important feature of the invention is the provision of wicks of a number and size to supply a proper amount of water to the soil in the container. The wicks may be provided with knots or other markers 17 at intervals to indicate where they may be cut off by the plant grower since certain plants require more water and damper soil than others. By making it possible so to control the water supply, a condition of feast or famine is avoided. Comparative tests on materials which are most suitable for use as wicks shows that asbestos, glass wool, wool, linen and cotton are affected by decay and rotting in the soil in the order named, and for this reason I prefer asbestos. It is, of course, within the contemplation of the invention to use other forms of dispersing water beneath the soil surface, such as, by perforated pipes, felted plug siphons with extending fingers, in place of the grommet and wicks but for present purposes, the latter is preferred.

Intermediate sections, as for example 18, may be cemented or otherwise suitably attached to the base 11 and top sections or the sections may be joined by felting or equipped with some other sealing matter to insure a snug joint throughout as illustrated for example in Figs. 3, 4 and 5. Intermediate sections when used, as well as the top section, (all of which may be referred to as the superstructure) are preferably made of some transparent material such as a suitable glass or plastic and will be of a configuration adapted exactly to fit over the base or soil container. To insure a snug fitting, the bottom edge of any portion of the superstructure may be grooved upwardly as at 19 so it can set down in sealed engagement upon the top edge of the base section although any of the other ways mentioned above can equally be employed to advantage. Should the increasing size of the container necessitate a greater supply of water than can conveniently be stored in the reservoir attached to the outside of the base section, a large reservoir can readily be attached to the back, sides or both ends of the intermediate section in the same manner as heretofore described in connection with the base and additional wicks supplied to carry water to the plants. It is of course contemplated that potted plants can be cultivated within such a container by leading the watering wicks beneath the soil surface within the pots. As an alternative, the soil container may have partitions placed therein as shown in dotted line position in Fig. 1 (and partly in section Fig. 2) since such root confinement increases the blooming qualities of the plants.

The top section or upper portion of the superstructure of the propagator houses an ultra-violet or other suitable electrified light source 20, adapted to provide artificial sunlight for the growth of the plant. In this connection, it is essential that the location of the light be in a concealed position (and this may be done in this particular construction, for example, by blacking-out in any suitable manner the upper angular portion of the top section) relative to that of the sun, substantially directly above the objective of its light rays and its effectiveness can be enhanced if it is equipped with a concentrating reflector 21, which is preferably so constructed that it can be given a half turn or more from the outside by a lever 22 or by any other suitable means to shut off the light rays. Such an arrangement prevents an over-abundance of light when not needed and make possible its reduction to a minimum when desired without entirely shutting out heat radiation. Any other location of such a heating and lighting unit might cause an unsightly and misshapen plant growth.

In growing certain plants, additional heating of the soil may be required and to this end, there may be provided an attachable electrical heating element (not shown) properly insulated and encircling the base or sides of the soil container although this is optional. By so applying heat to the soil through the side walls of the container, the heat will be indirectly distributed to the plant roots and not directly as would be the case if the soil were heated from the bottom which in a smaller container would be very harmful to the roots, ultimately drying them out. Such a heating device may be controlled by any suitable thermostat, to maintain a desired temperature.

At an advantageous position in the top section, there is provided one or more automatic type ventilators 23. For example, a section may be cut out of the top portion at any desired point and over this there may be partially attached a piece of thin pyralin 24 or other suitable plastic material, cemented, stapled or otherwise suitably attached to the outside surface of the top section, all as is clearly shown in detail in Fig. 7. My experiments have shown that when such plastic material is located over an opening in a container exuding high humidity or unusual warmth, the plastic material being heat-responsive curls upwardly and outwardly at its free ends and when the air within the container becomes dry and cools it tends to flatten out. This furnishes an excellent device for automatic ventilation of the propagator maintaining thereby both the humidity and the temperature substantially constant. It should be understood that as the temperature rises in such a propagator in which moisture or water is present, the humidity rises accordingly and therefore, unless the water reservoir is allowed to become dry, the ventilator will function as intended. Additional ventilators may be supplied in other portions of the propagator, although this is optional.

Of particular advantage in connection with the present invention, is the fact that the propagator may be designed and molded into artful and decorative forms and with the added advantage of simulated sunlight within the propagator such decorative designs may be placed in any location in a room to emphasize and lend to its decorative qualities as well as to the household designs to which the invention is applied. The number of these is manifold but some may here be mentioned in combination with which the invention is intended to be utilized; picture frames; shadow-box frames; hanging shelves (see Fig. 8); wall brackets; table ornaments; shadow boxes within room walls; installed within pieces of furniture such as shelves of bookcases, under glass coffee table tops, corner cupboards, electric lamp bases, etc., and an infinite variety and number of objects to lend thereto and increase the decorative surroundings in which they are placed.

Many advantages are attendant upon the present invention, some of which may be summed up as follows:

Within the sealed container humidity and temperature may be kept constant;

An ultra-violet ray electric light, or other electric light, at the top of the container, in the relative position of the sun, provides ideal light under which the plants will grow. Many plants prefer such light to sun-light as the rays are not so hot and by burning more or less continuously ideal light for propagation is provided, even at night;

Associated with the container is a reservoir for water preferably to be filled when required from outside the container. This makes it unnecessary to open the container for this purpose, saving this trouble and avoiding disturbance to the plants;

Water is fed from the reservoir to the top of the soil around the plants by a wick or wicks, gauged as to size and length to suit the exact requirements of the plants. This means the plants will always be kept ideally watered so long as the reservoir contains water;

Plant tablets, or other forms of concentrated plant food added to the water in the reservoir when required will be carried by the wicks to the plant;

Providing all the essentials for satisfactory growth of plants, particularly ultra-violet or other electric light, they need not be placed near windows but may be placed in any part of a room where they will flourish and be decorative;

The containers may be formed in any shape or size, thus lending themselves to the most artistic modeling, or they may be built into pieces of furniture, into walls, etc., to emphasize the decorative effects of beautiful growing plants contained therein;

The containers may be built, formed, stamped or molded from glass, metal, plastics, plaster, ceramics or any other suitable workable material;

Provision may be made to place in the containers small pools, or even running water, if connected with a small pump, to be kept supplied with water, or at proper level, by a second reservoir attached to the container and in the same manner filled if desired without opening the container;

Provision is made for aerating the soil, draining the same of excess water and also ventilation control of the inside of the container.

It will thus be seen that the objects and advantages hereinbefore set forth may be readily and efficiently attained and since certain changes may be made in the above constructions and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a plant propagator particularly adapted for indoor decorative and display purposes which comprises a soil container having plant life suitably arranged therein and protected by an outer transparent casing enveloping said plant and having a water supply system associated with said soil container with means adapted to carry controlled amounts of water to said soil and supply the roots of said plant life, in combination with an electric light unit concealed within said outer protective casing enveloping said plant life which simultaneously gives light and heat to said plant life thereby subjecting the same to stimulated atmospheric conditions of humidity and temperature in their cycle of growth, and venting means suitably located within said casing, said venting means being adapted to open and close responsive to variation in said conditions of humidity and temperature and adapted to maintain said conditions substantially constant.

2. A plant propagator according to claim 1 in which said electric light unit is concealed within the upper part of said container and in the relative position of sunlight and whereby said light being so concealed decoratively illuminates and displays said plant life.

3. A plant propagator according to claim 1 in which the electric light unit can be controlled exteriorly of said transparent casing whereby a maximum or minimum amount of light can be provided as needed for proper plant growth and variation in illuminating display whereby said decorative effects are enhanced while maintaining proper amount of heat from said light source and consequently maintaining said humidity and temperature conditions substantially constant.

4. In a plant propagator particularly adapted for indoor decorative and display purposes consisting of a soil container having plant life and protected by an outer transparent casing enveloping said plant and having a water supply system associated with said soil container with means adapted to carry controlled amounts of water to said soil and supply the roots of said plant life, the improvement which comprises a transparent casing of sectional construction whereby the bottom and top sections are permitted to remain unchanged but are adapted to receive supplemental intermediate sections to accommodate increases in size of the plant under the stimulated atmospheric conditions in their cycle of growth.

CLAUDE R. COLLINS.